Nov. 2, 1943. L. DE MARKUS ET AL 2,333,154
REFRIGERATION APPARATUS
Filed Oct. 10, 1939 7 Sheets-Sheet 1

Fig.1.

Nov. 2, 1943.   L. DE MARKUS ET AL   2,333,154
REFRIGERATION APPARATUS
Filed Oct. 10, 1939   7 Sheets-Sheet 2

Inventor
Louis De Markus and
Leon Buehler, Jr.
By Hyatt Dowell
Attorney

Nov. 2, 1943.   L. DE MARKUS ET AL   2,333,154
REFRIGERATION APPARATUS
Filed Oct. 10, 1939   7 Sheets-Sheet 4

Nov. 2, 1943.   L. DE MARKUS ET AL   2,333,154
REFRIGERATION APPARATUS
Filed Oct. 10, 1939   7 Sheets-Sheet 6

Fig. 8.

Patented Nov. 2, 1943

2,333,154

UNITED STATES PATENT OFFICE 2,333,154

REFRIGERATION APPARATUS

Louis De Markus, Blawnox, and Leon Buehler, Jr., Waynesboro, Pa., assignors to Frick Company, Waynesboro, Pa., a corporation of Pennsylvania Application October 10, 1939, Serial No. 298,864

15 Claims. (Cl. 62—122)

This invention relates to the brewing of beer and more particularly to the treatment of carbon dioxide evolved during the beer fermentation process, the collection and storage of the said carbon dioxide in both gaseous and liquid phases, and the selective utilization of gaseous and liquid carbon dioxide in the handling of the beer.

This application is a continuation in part of copending application Serial Number 237,100, filed October 26, 1938, now Patent No. 2,239,485 granted April 22, 1941, entitled Refrigeration apparatus, and as explained in that case, in the treatment of beer between the time of processing in the brew kettle and the moment the beer reaches the consumer's glass, if the beer is to be of high quality having desirable characteristics, it is essential that quantities of carbon dioxide gas, having predetermined characteristics, be available for use in connection with the beer during this interim.

While it is desirable that air come in contact with the beer at certain times, for example during the beginning of fermentation whereby oxidation takes place hastening the propagation of the yeast and accelerating the decomposition of fermentable sugar into carbon dioxide gas and alcohol, and at the time beer is dispensed from a faucet or the mouth of a bottle into a glass whereby the mixture of air with the beer creates a proper foam-head and brings out the choicest aromas, yet it is generally to the benefit of the quality of the beer if it be protected from improper oxidation, which protection may be effected by proper treatment with carbon dioxide of predetermined characteristics, as will later be described.

During the fermentation process, the carbon dioxide gas generated expels surplus air from the beer and protects it from further deleterious air contacts by blanketing the beer surface with this inert and antiseptic gas. Further, as uniformity of foam is highly desirable especially in connection with packaged beer as in cans or bottles, the absence of air and the presence of carbon dioxide of the proper characteristics serves to maintain uniformity in the conservation or preservation of the ingredients of the beer and therefore indirectly facilitates uniform foam formation and consistent foam retention of the beer in all bottles or cans so treated, for the character of the foam depends primarily upon the nature and condition of the ingredients of the beer.

It has been found in practice that not only is it essential that the beer be treated with pure carbon dioxide, but that the carbon dioxide used for the treatment be as least altered as is possible with regard to the volatiles that fermentation gas contains. While this quality of the carbon dioxide is important and not to be disregarded at any time during the manufacturing, handling or processing of the beer, yet some steps of the process require the highest standard of unaltered carbon dioxide whereas in other steps of the process a lesser standard of unaltered carbon dioxide will be satisfactory. It is important, however, that the standards of carbon dioxide be related to the proper steps in the process, otherwise an inferior beer will result. For example, if a lesser standard of carbon dioxide is used in that step of the process which requires the highest standard, then one may expect an inferior beer. In the carbonation of the beer, it is essential that a very high standard of carbon dioxide available be utilized if proper taste, aroma, foam and shelf age characteristics are to result. In the transferring of beer to various points of processing and in the filling of containers with the newly brewed beer, it is essential that carbon dioxide gas and not air be utilized, but the standard of this carbon dioxide gas may be not so high as that of the gas used in the carbonation step.

Prior to the instant invention, air has been used for effecting transportation of the beer from one place to another and filling of containers on the theory that the air is in contact with the beer for so short a time that a measurable deleterious effect does not occur. This theory, however, is fallacious for it has been shown that a beer of superior taste and uniform character capable of greater shelf life will result if carbon dioxide is used for this purpose. Also prior to this invention, no provisions had been made for storing carbon dioxide in sufficient quantities to provide for its proper use to effect a beer packaged in kegs, bottles, or cans which is more appealing to the palate, more delicate in aroma, having a consistent foam-head, a pasteurization taste which is least noticeable; a beer which can better stand the abuses of transportation, the various temperatures of storage, and consequently a much longer, uniform shelf life.

It is an object of the instant invention to provide a novel system for the collection and storage of carbon dioxide gas evolved during a beer fermentation process and a selective arrangement for the distribution of the collected carbon dioxide to points of utilization.

It is a further object of the instant invention to provide a system of selective distribution of carbon dioxide gas and carbon dioxide liquid.

It is another object of the invention to provide a novel arrangement for the bottling of carbon dioxide.

Other objects and the nature and advantages of the invention will be apparent from the following description taken in conjunction with the accompanying drawings, wherein:

Figure 1:
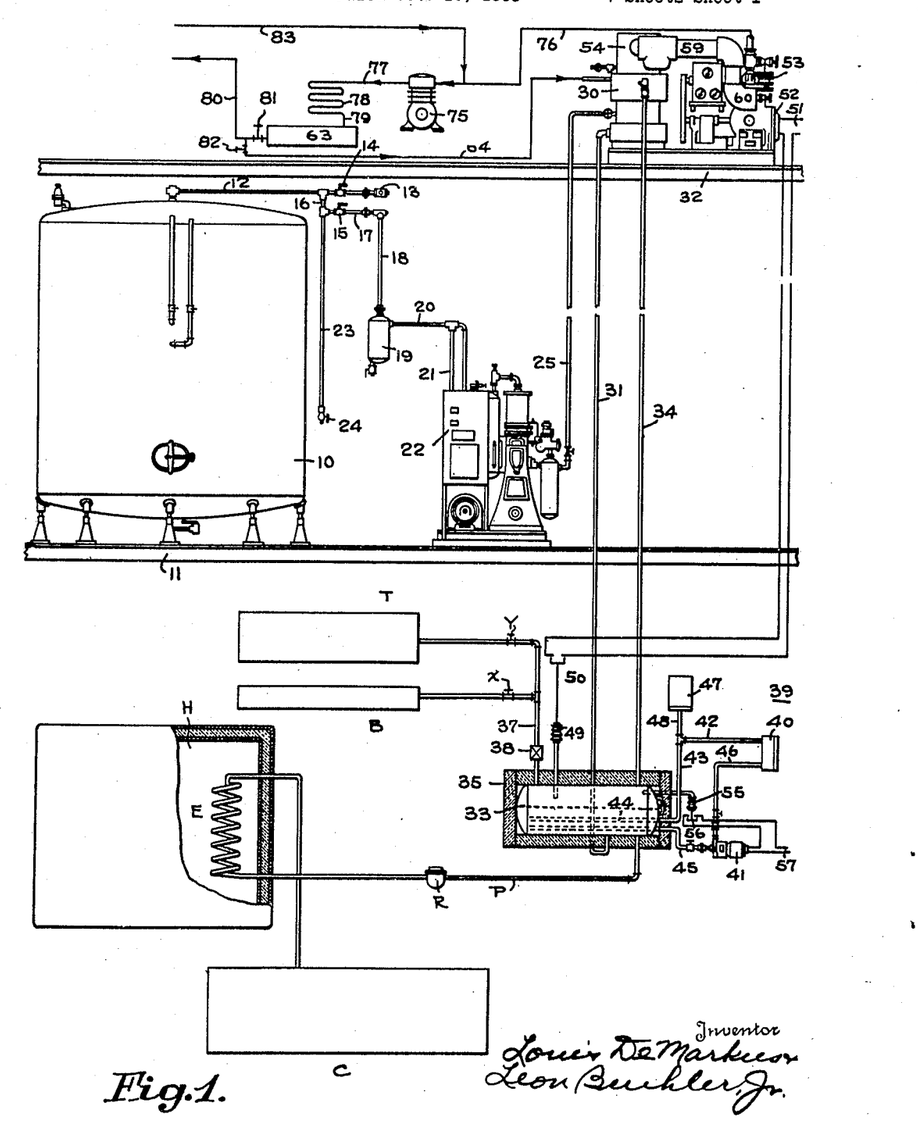
Fig. 1 is a diagrammatic view of a system for the collection, storage and utilization of carbon dioxide gas evolved during a beer fermentation process.

Referring to the drawings and more particularly to Fig. 1, a closed beer fermentation tank 10 is arranged on the brewery floor 11. By means of conduit 12 leading from the upper wall of the fermentation tank 10, carbon dioxide which has evolved during the fermenting process may be exhausted to the atmosphere through connecting conduit 13 when the valve 14 is open. With the valve 15 open, however, and the valve 14 closed, the evolved carbon dioxide may be drawn through conduits 16, 17 and 18, foam trap 19 and thence through conduits 20 and 21 to carbon dioxide gas compressor 22. Associated with the conduits 16 and 12 leading from the fermentation tank 10 is a conduit 23, the lower portion of which is controlled by valve 24 which may be used for sampling the gas, whereby it may be ascertained whether or not the gas is in proper condition for use as intended.

From the carbon dioxide compressor 22, which is described in greater detail in Pat. No. 2,239,485, the gas at a pressure of approximately two hundred and twenty-five pounds to two hundred and fifty pounds per square inch is passed through conduit 25 to condenser 30, also described in detail in said patent, and in which condenser 30 the carbon dioxide gas is translated to its liquid form and by gravity is passed through conduit 31 to a storage tank 33, wherein the carbon dioxide is stored. The equalizing conduit 34 connects the portion of the condenser 30 above the liquid level therein with the gaseous carbon dioxide space of the storage tank 33 about which is placed insulation 35 in order to retard the flow of heat from the ambient about the storage tank thereinto.

Leading from the upper portion of the storage tank 33, or the gaseous carbon dioxide space above the liquid level therein, is a conduit 37 which acts to distribute gaseous carbon dioxide to the beer transporting or conveying apparatus T, indicated schematically, and the bottle filling apparatus B, also indicated schematically. The valves X and Y serve to control the passage of gas to the apparatus T and the apparatus B, as desired. The transporting or conveying apparatus is operated by fluid pressure or other motivating force but involves contact of gaseous carbon dioxide with the beer being handled. Among the various steps involved in the filling of bottles or other containers with beer, the step of displacing the air in the containers to be filled with carbon dioxide gas is not to be overlooked. In accordance with the invention, gaseous carbon dioxide removed from the gaseous space in a storage tank 33 above the liquid level therein is used for this purpose.

Leading from below the liquid level within the storage tank 33 is a conduit P which serves to pass liquid from the storage tank 33 to a place of utilization such as carbonating apparatus C. Within the conduit P there may be installed a pressure reducing valve R prior to the entrance of the conduit P to within a room H to be cooled which may be insulated as illustrated. In the conduit P, subsequent to the reducing valve R and within the room to be cooled is the heat absorbing coil E which acts to economically utilize the latent heat of evaporation of the liquid carbon dioxide, whereby it will not be wasted prior to its use in the carbonating apparatus.

Located within a second cold storage room 39, or other room from which it is desired to remove heat, is a heat absorber 40, which may comprise a finned coil or equivalent heat exchanger through which a suitable heat exchange medium is adapted to be circulated by the motor pump 41 which draws relatively warm heat exchange medium, say at a temperature of 32° to 36° F. through conduit 42, conduit 43, hairpin coil 44 located within the liquid carbon dioxide stored in the storage tank 33, thence through conduit 45, motor pump 41, and through conduit 46 back to the heat absorber 40 to complete the cycle. The hairpin coil 44 serves to discharge heat from the heat exchange medium passing through it which has received heat from the heat absorber 40 to the liquid carbon dioxide within the storage tank 33, converting it from a liquid phase to a gaseous phase, in which gaseous phase it may be passed through the conduit 37 controlled by a valve 38 to a place of use such as for example, the apparatus T or the apparatus B, or both, or their equivalents. A storage tank 47 connected to the conduits 42 and 43 by a conduit 48 allows for expansion and contraction of the heat exchange medium, which may comprise ethyl alcohol, ethyl alcohol and water, or other brine.

The provision for the association of a distributing system including conduit 37 with the storage tank 33 whereby gaseous carbon dioxide may be passed to the apparatus T and B; and the distributing system including the conduit P for effecting transfer of carbon dioxide from the storage tank 33 to the apparatus C, effects the utilization of fermentation gas of high standard where it is required in the handling of the beer and the utilization of a lesser standard of carbon dioxide where the higher standard is not required. It has been found that the liquefaction of carbon dioxide makes for its purity and high standard and in those processes which require a high standard, such as for example, carbonation, it is conducive to excellent results if liquid carbon dioxide is regasified and used where high standard carbon dioxide is required. The purification that takes place upon liquefaction is perhaps due to the fact that some of the impurities do not liquefy and remain in a gaseous phase and some condense and separate due to difference in weight. In order to remove these impurities from the surface of the relatively high standard liquid carbon dioxide, utilization of the gaseous carbon dioxide vapors located above the level of the liquid within the storage tank 33 is made. The distributing system including the conduit 37 effects this latter purpose and serves to transfer gaseous carbon dioxide of not the highest grade to those places of utilization in the handling of beer which do not require carbon dioxide of the highest grade. The conduit P which serves to transfer high standard liquid carbon dioxide to the carbonating apparatus C or other places of utilization which require carbon dioxide of high standard, has been described as including a reducing valve R which serves to reduce the pressure or help translate the phase of the carbon dioxide passing therethrough. It is to be understood that it is within the scope of this invention to omit the use of such valve.

In order to control the carbon dioxde pressure and liquefy carbon dioxide, a pressure responsive device 49 is arranged in association with the interior of the storage tank 33 and with a switch 50 in circuit 51 of the electric motor 52 which drives compressor 53 which in turn serves to withdraw evaporated ammonia from an evaporator type heat exchanger 54 of condensing apparatus 30, whereby when the carbon dioxide pressure within the storage tank 33 has dropped to say one hundred and seventy-five pounds, the switch 50 will be open and the suction effect of the compressor 53 caused to stop. When the pressure within the storage tank 33 reaches say two hundred and twenty-five or two hundred and fifty pounds, the switch 50 will be closed and the operation of the compressor 53 begun.

Should the carbon dioxide gas be withdrawn from the conduit 37 faster than the carbon dioxide will boil off from the liquid within the storage tank 33 by reason of the heat leakage thereto from the ambient through the insulation 35, then operation of the fluid pump 41 will be effected and warm brine will be passed through the hairpin coil 44, warming the carbon dioxide liquid, evaporating a portion thereof and increasing the pressure in the storage tank 33. This operation is effected by pressurestat 55 associated with the interior of the storage tank 33 and a switch 56 in the circuit 57 of the motor pump 41 in a manner such that when the pressure in the storage tank 33 is at or below 125 pounds, the switch 56 will be closed and operation of the motor pump 41 initiated; and when a pressure of 150 pounds within the storage tank 33 is reached, the switch 56 will be opened and operation of the motor pump 41 will cease. Though this arrangement effectively supplies heat to the carbon dioxide in liquid phase within the storage tank 33, it is to be understood that it is within the scope of the invention to utilize any other heating means for this purpose, such as, for example, a steam heating coil or an electric resistance coil.

Ammonia refrigerant vapor withdrawn from the ammonia space within the heat exchanger 54, illustrated and described in greater detail in the aforementioned copending application, of the condensing apparatus 30, is withdrawn through the conduit 59 to the suction inlet 60 of the low pressure ammonia compressor 53 wherein the ammonia vapor is compressed to a pressure corresponding to the suction pressure of the main compressor 75 of the brewery refrigeration system. A conduit 76 is associated with the discharge side of the low pressure compressor 53 and serves to lead ammonia refrigerant vapor from the low pressure compressor to the suction side of the main ammonia compressor 75 wherein the refrigerant is compressed to a condensing temperature and passed through conduit 77 which leads to ammonia condenser 78 from whence the liquid ammonia is passed through conduit 79 to the receiver 63. From the ammonia receiver 63 liquid ammonia may be passed to the brewery refrigeration coils, not shown, by means of conduit 80 controlled by valve 81, and, similarly, liquid ammonia may be passed through the conduit 64 controlled by valve 82 to the heat exchanger 54 as already described. Ammonia refrigerant vapor evaporated in the brewery refrigeration coils is returned to the brewery ammonia compressor through conduit 83 which is open to the conduit 76 leading to the suction side of the main compressor 75.

The liquid carbon dioxide evolved by the above described apparatus may not only be utilized directly from the storage tank 33 but it may be stored in portable tanks and conveyed to other localities for various purposes including not only the carbonation of beer but also the carbonation of soda water and other beverages. In order to provide for the transfer of liquid from the storage tank 33 to portable containers 100 such as illustrated in Figs. 2 and 3, the apparatus disclosed in these two figures may be utilized.

Figure 2:
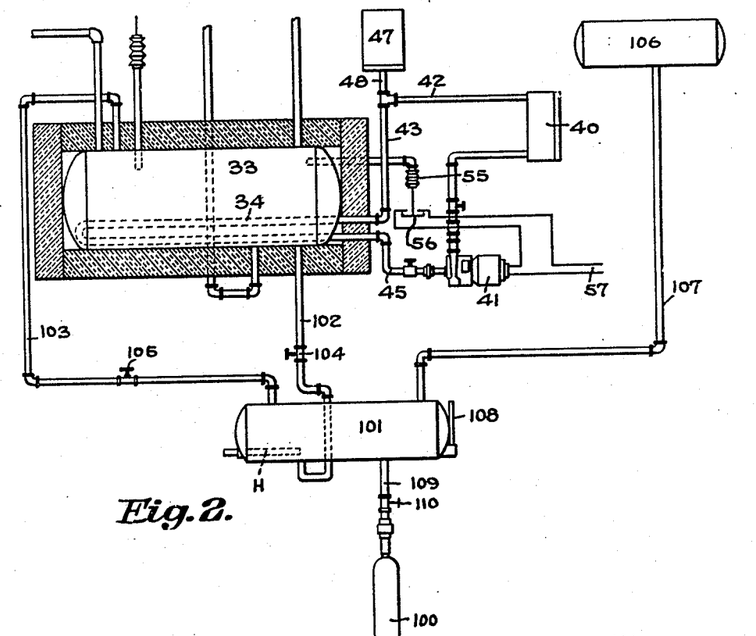
Fig. 2 is a diagrammatic view of a system for collecting and bottling carbon dioxide liquid; and, Fig. 3 is a view similar to Fig. 2 but of a modified system permitting substantially continuous filling operations.

Referring to Fig. 2, an auxiliary receiver 101 is provided below the level of the storage tank 33 and is connected therewith by liquid line 102 and equalizing vapor line 103. A valve 104 is located in the line 102 and a valve 105 is located in the line 103, whereby when the valves 104 and 105 are open, the pressure in both tanks will be substantially the same if the liquid head is disregarded. As a safety measure, a tank 106 is located above the storage tank 33 and is connected to the auxiliary receiver 101 by conduit 107, whereby the receiver 101 and tank 106 taken as a unit will never be completely filled by liquid from storage tank 33. A sight glass 108 is associated with one end of the receiver 101 whereby the filling thereof to the desired level may be readily effected.

A heater H, which may be of the electric resistance type, fluid medium type, or its equivalent, is located within or in heat exchange relation with the interior of the receiver 101, whereby when the valves 104 and 105 are open to admit a quantity of liquid carbon dioxide to the receiver 101, which quantity is preferably less than the entire volume of the receiver 101, and the valves 104 and 105, then closed, the heater H' may be operated to effect transmission of sufficient heat to the liquid within the receiver 101 to raise its pressure to a value sufficient to effect transfer of the liquid within the storage tank 101 through conduit 109 controlled by discharge valve 110 into the shipping container 100. The container 100 may then be stoppered or closed in any desired manner and the process described repeated in order to effect the filling of a second container. It will be appreciated that the liquid within the container 101 will not readily flow into the tank 100 by gravity as the temperature of the liquid carbon dioxide is very low and the pressure correspondingly low. The temperature of the container 100 and the ambient thereabout being very high, any liquid carbon dioxide of low temperature contacting same would immediately have its pressure raised to that which corresponds to its temperature which would be in the neighborhood of one thousand pounds per square inch. Accordingly, the above described apparatus and method serve to raise the pressure of the liquid within the auxiliary receiver 101 to a value sufficient to effect the transfer of liquid from the receiver 101 to the shipping container 100.

Figure 3:
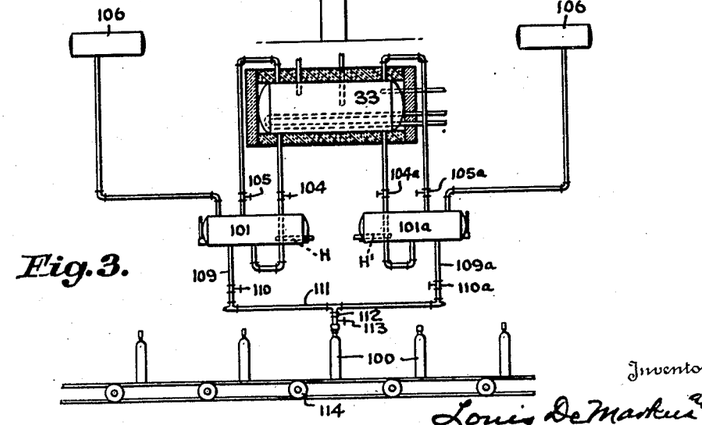

Not only may the process of filling shipping containers be intermittent as described in connection with Fig. 2, but it may be more or less continuous when the apparatus in Fig. 3 is utilized. In this embodiment of the invention two auxiliary receivers 101 and 101a are utilized, their connections with the storage tank 33 being similar to that described of the embodiment illustrated in Fig. 2. Leading from the bottom of each auxiliary receiver 101 and 101a are discharge lines 109 and 109a, each individually controlled by valves 110 and 110a. A manifold 111 is adapted to receive the discharge of the lines 109 and 109a and convey same to the containers 100 through discharge connection 112 controlled by discharge valve 113. In the operation of the substantially continuous device illustrated in Fig. 3, the shipping containers 100 are adapted to be passed by the conveyor 114 beneath the discharge connection 112. The operator effects the filling of the auxiliary receivers 100 and 100a alternately by the operation of the valves 104 and 105 as described, and then the valves 104a and 105a in a similar manner. The heaters H and H' are operated at a time corresponding to the operation of the valves 104 and 105 and the valves 104a and 105a. When the valves 104 and 105 are in open position and the filling of the auxiliary receiver 101 is being effected, then the valves 104a and 105a are closed and the heater H' is in operation. The heater H is then turned off. The valve 110 is closed and the valve 110a is opened. The valve 113 is opened whereby the container 100 will be filled by liquid discharged from auxiliary receiver 100a. When auxiliary receiver 100a is empty, the valve 110a is closed, the heater H' is turned off, the valves 104a and 105a are opened, the valves 104 and 105 are closed, the valve 110 is opened, the heater H is turned on, and a succeeding container filled by liquid from auxiliary receiver 101. The size of the auxiliary receivers may be related to the size of the shipping containers 100. Thus, it will be understood that a substantially continuous filling of the containers 100 may be effected by the apparatus disclosed in Fig. 3.

Figures 4, 5:
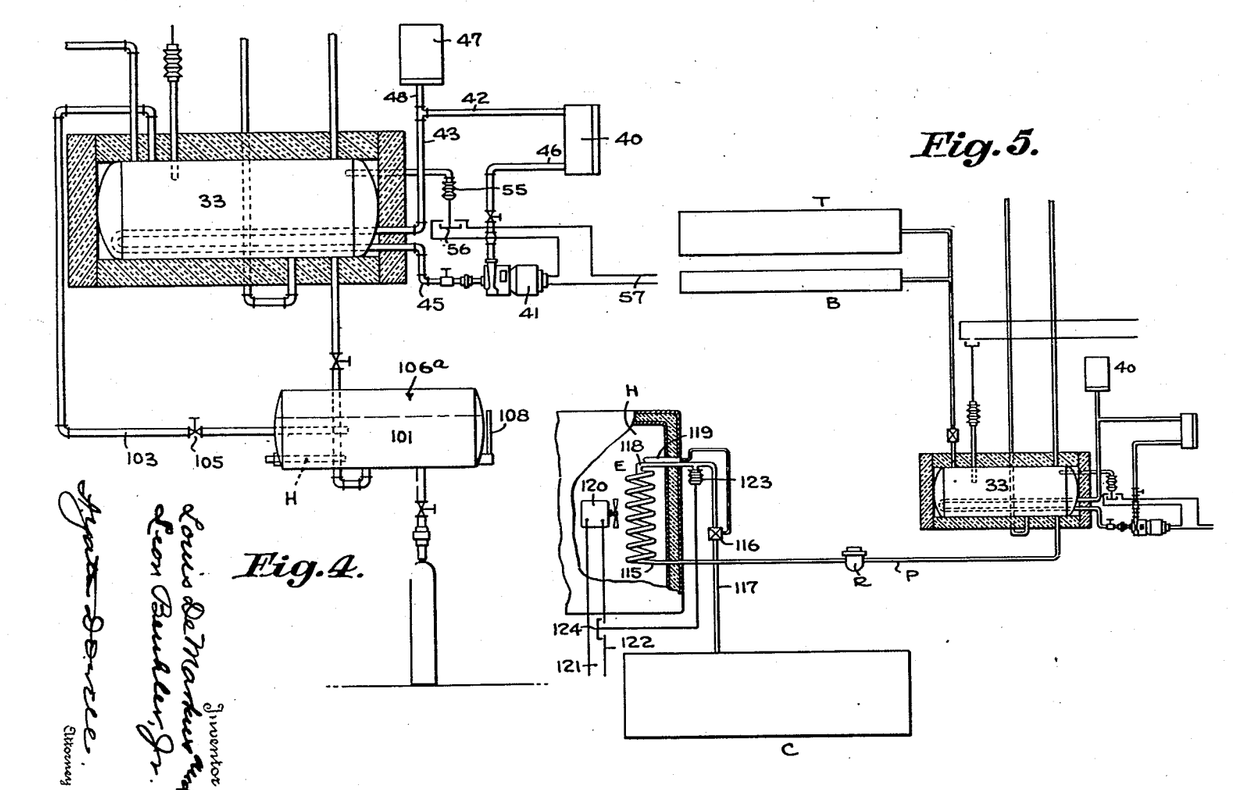
Fig. 4 is a fragmentary diagrammatic view of a modified system for collecting and bottling carbon dioxide liquid.
Fig. 5 is a fragmentary diagrammatic view of a modified system for the collection, storage and utilization of carbon dioxide evolved during a beer fermentation process and involving the regasification of carbon dioxide liquid.

The utilization of the relatively high level tank 106 and connecting line 107, as depicted in Fig. 2, in association with the auxiliary receiver 101 may be dispensed with in the modified construction shown in Fig. 4 wherein the pipe line 103 leads to within the auxiliary receiver 101 at a location below the top whereby a gas pocket 106a is formed above the liquid level in order that the auxiliary receiver 101 may never be completely filled with liquid. Should the auxiliary receiver 101 thereupon attain an abnormally high temperature so as to measurably have the pressure therewithin increased, the gas pocket above the liquid level therewithin will be capable of functioning as a safety factor preventing the bursting of the auxiliary receiver 101, which undesirable effect might take place if no provision were made for the gas pocket 106a. Since liquid within the auxiliary receiver 101 is relatively incompressible, a comparatively slight temperature rise in the tank completely filled with liquid will result in a great and possibly danger pressure rise. When a gas space is provided, as described, the pressure increase will be relatively small and approximately equivalent to the increase in condensing pressure due to the temperature rise. Whereas, in the modified system shown in Fig. 4, the pipe line 103 enters the auxiliary receiver 101 below the top, it is to be understood that an equivalent structure might involve the entrance of the pipe 103 within the auxiliary receiver 101 from the top thereof but that the outlet of the pipe 103 in such construction would be below the liquid level, the line 103 extending through the upper wall of the auxiliary receiver 101.

The advantages involved in the utilization of the relatively very pure carbon dioxide in its liquid phase for carbonating purposes has already been discussed and a system for the regasification of this relatively pure carbon dioxide is shown in the lower portion of Fig. 1 and involves the reducing valve R and the evaporator coil E. A modified system for regasifying the relatively pure carbon dioxide is shown in Fig. 5 wherein the conduit P serves to lead liquid carbon dioxide from the insulated storage tank 33 to the inlet 115 of evaporator coil E. Replacing the reducing valve R prior to the inlet 115 of an evaporator E is the thermostatically controlled valve 116 located in the line 117 which connects the outlet 118 of the coil E with the carbonating apparatus C. A thermostatic bulb 119 located in or adjacent and in contact with the line 117 at or subsequent to the outlet 118 of the coil E serves as the actuator for the valve element of the thermostatic valve 116. This thermal bulb 119 is constructed, arranged and adjusted to effect the opening of the valve 116 when the temperature of the carbon dioxide leaving the evaporator coil E is in excess of the evaporating temperature of the carbon dioxide liquid within the evaporator coil. This construction and adjustment serve to prevent the passage of liquid carbon dioxide from reaching the valve 116 and the apparatus beyond it. In order to supply heat to the evaporator coil E, a motor fan 120 may be located adjacent the said coil and force air from the ambient thereabout over the coil E. A source of electric current 121 may supply the energy for the operation of the motor fan 120 through the circuit 122. Should the pressure or temperature of the carbon dioxide leaving the evaporator coil attain an excessive value due to the continued operation of the motor fan 120, Sylphon tube 123 directly connected with the line 117 subsequent to the outlet 118 of the coil E will expand and effect the opening of switch 124 within the circuit 122. As soon as the pressure or temperature which corresponds to the pressure within the line 117 directly subsequent to the outlet 118 of the coil E once again reaches a normal low value, the bellows 123 will contract and effect the closing of the switch 124 in order that the motor fan 120 may again serve to force relatively warm air over the evaporator coil E to regasify the relatively pure carbon dioxide led therewithin from the insulated storage tank 33 by the conduit B. It is to be understood that it is within the scope of the invention to associate a measuring or metering orifice with the pipe line 117 adjacent the thermostatic valve 116 and the valve 116 be so designed as to be either fully opened or fully closed depending upon the temperature adjacent the thermal bulb 119.

Figure 6:
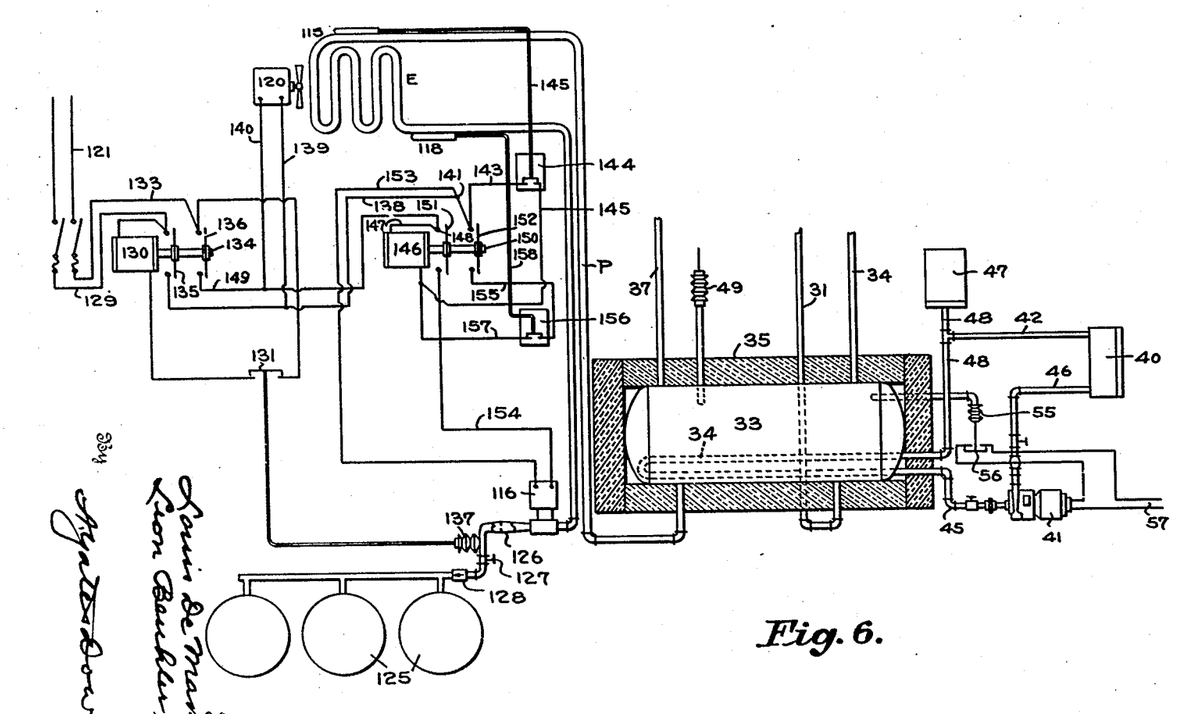
Fig. 6 is a view similar to Fig. 5 but illustrating a modified system of controls.
Figure 7:
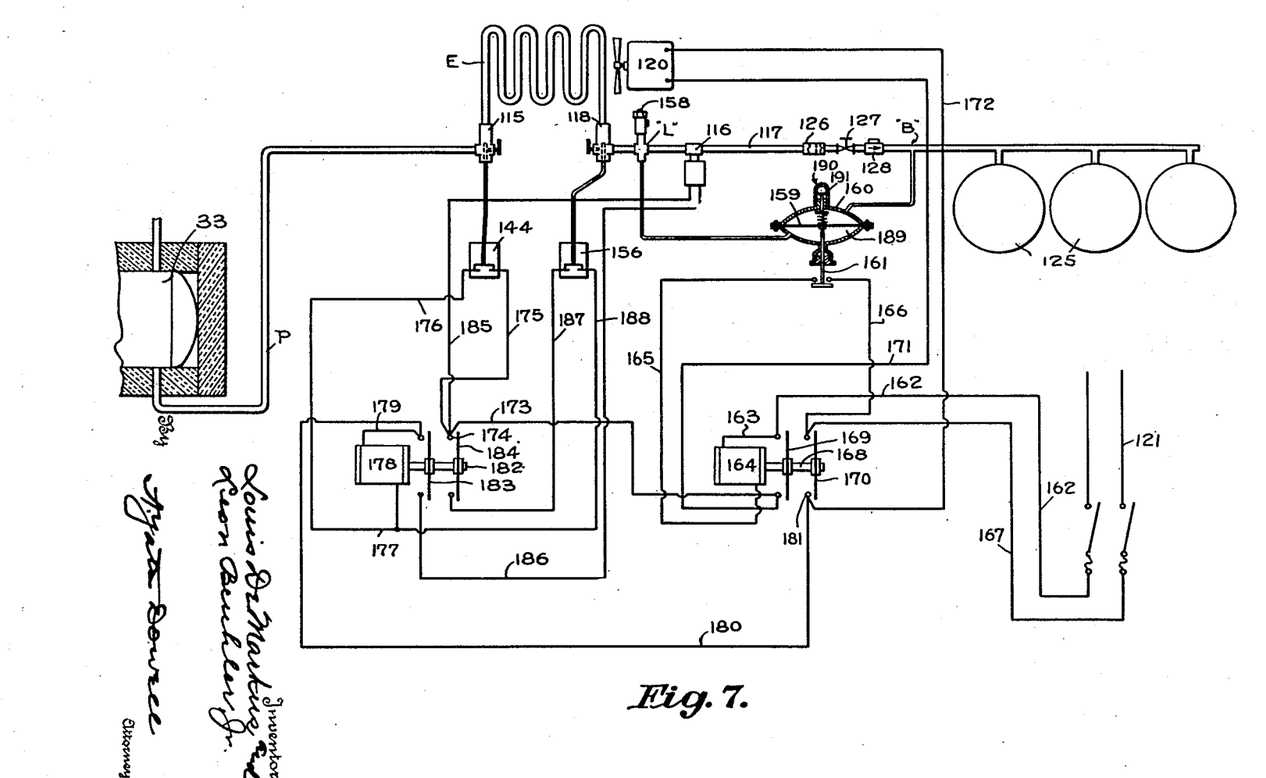
Fig. 7 is a view similar to Figs. 5 and 6 but illustrating a still further modified system of controls.

During regasification of the relatively pure liquid carbon dioxide, and in its passage through the evaporator coil E, the temperature of the exterior of the coil E may be well below the dew point of the ambient thereabout and in fact the temperature may drop below the freezing point. Accordingly, during operation of the equipment, ice may form on the surface of the coil E and it is essential that provision be made for the de-icing or de-frosting thereof. Referring to Fig. 6 the conduit P serves to lead relatively pure carbon dioxide in liquid form the insulated storage tank 33 to the inlet 115 of the evaporating coil E which receives heat from the ambient forced thereover by motor fan 120. Regasified relatively pure carbon dioxide leaves the outlet 118 of the evaporator coil E and is led to the storage tanks 125 which serve to hold the reevaporated gas through the pipe line 117 which is controlled by the electromagnetic valve 116. A metering orifice 126 is located in the line 117 subsequent to the electromagnetic valve 116. In series with the orifice 126 and subsequent thereto in line 117 is a hand valve 127. In series with the hand valve and subsequent thereto is a one way or check valve 128 which prevents back flow from the storage tanks 125 to the evaporator coil E when the electromagnetic valve 116 or the hand valve 127 is opened. An electric source 121 serves to feed electric current through the line 129 through the electromagnetic coil 130, through pressure switch 131, when the same is closed, through line 132 which is connected to line 133 which leads back to the electric source 121. The electromagnetic coil is arranged about the pole piece 134 and serves to hold the switches 135 and 136 closed as long as the pressure switch 131 is closed. The pressure switch is actuated by a pressure Sylphon element 137 which is connected to the carbon dioxide conduit 117 at a point subsequent to the electromagnetic valve 116 and orifice 126, whereby when the pressure within the line 117 at the location of the Sylphon 137 becomes excessive, the pressure switch 131 will open effecting the opening of the switches 135 and 136. However, during normal operation, the pressure within the pipe line 117 is not excessive and the pressure switch 131 is closed effecting the closing of the switches 135 and 136 by the energization of the electromagnetic coil 130. With the switches 135 and 136 closed, electric current from the source 121 may pass through line 129, through the switch 135 to the line 138 which connects with the line 139 leading to the motor fan 120. A line 140 returns from the motor fan 120 and connects with line 141 which, when the switch 136 is closed, is connected to the line 133 which leads back to the electric source 121. Hence with the pressure switch 131 closed, the electromagnetic coil 130 will close the switches 135 and 136 to effect the energization and operation of the motor fan 120 which will effect the supply of heat to the evaporator coil E necessary to make for regasification of the liquid carbon dioxide within the evaporator coil E. The electromagnetic valve 116 is normally opened by the following electrical current; current passing through the line 138 to the junction 141 and thence through the lines 142 and 143 through the thermostatic switch 144 which is closed at temperatures above 32° F., through the line 145 which is connected with the electromagnetic coil 146. The current then passes on through the coil 146, the outlet of which is associated with line 147 which is connected to junction 148. Line 147 passes from the junction 148 to line 149 which is connected to the line 140 and from thence the current passes back across the switch 136 and through the line 133 to the electric source 121. Hence when the pressure within the line 117 is normal, the switches 135 and 136 are closed, the motor fan 120 is in operation and the electromagnetic coil 146 is energized so that it causes pole piece 150 to move in a direction to close switches 151 and 152 whereby current from line 138 may travel to junction 141 and then backward through line 153 through the electromagnetic coil within electromagnetic valve 116 and then back through line 154 and switch 151 to junction 148 and back through line 149, line 140, switch 136, and line 133 to the electric source 121. The energization of the electromagnetic coil within the electromagnetic valve 116 serves to hold this valve in open position. As long as the temperature at the inlet 115 of the evaporator coil E remains above 32° F. the operation described will take place for the thermostat 144 is associated by the line 145 with the evaporator inlet 115. While the switches 151 and 152 are closed, the temperature within the evaporator coil may drop down to 0° F., and the thermostatic switch 144 may open but the electromagnetic coil 146 will still be energized as the current from the line 142 will then pass through the switch 152 through the line 155, thermostatic switch 156, and line 157 to the electromagnetic coil 146. As the thermostatic switch 156 is adjusted so as not to open unless the temperature goes below 0° F., the operation described will still take place. However, if the temperature at the outlet 118 of the evaporator coil E with which the thermostatic switch 156 is connected by the line 158 drops below 0° F., indicating that defrosting is necessary, the switch 156 will open, the thermostatic switch 144 will be already open, and the electromagnetic coil 146 will be deenergized, opening the circuit to the electromagnetic coil within the electromagnetic valve 116 and the valve 116 will be closed preventing further regasification of the liquid carbon dioxide within the coil E. However, the motor fan 120 will continue to operate to effect the de-icing or defrosting of the evaporator coil E as long as the pressure within line 117 is not excessive. When the temperature at the inlet 115 of the evaporator coil E rises to 32° F., the electromagnetic valve 116 will again be opened and normal flow to the storage tanks 125 result An alternative system for the regasification of the relatively very pure liquid carbon dioxide is shown in Fig. 7 wherein the insulated storage tank 33 feeds liquid carbon dioxide through the conduit P, the evaporator coil E and line 117 to the storage tanks 125 which serve to hold the reevaporated or regasified liquid fermentation gas. As in Fig. 6, thermostatic switches 144 and 156, respectively, are associated with the inlet 115 and outlet 118, respectively, of the evaporator coil E and the orifice 126, the hand valve 127, and the check valve 128 are in series, in the order named, in the line 117 subsequent to the electromagnetic valve 116. Between the evaporator outlet 118 and the electromagnetic valve 116 and in the line 117 is safety valve 158 which is adapted to open should the pressure within the system prior to this valve become dangerously excessive. At this point in the system "L" and directly subsequent to the check valve 128 at the point "B" a pair of conduits are led from the line 117 to opposite sides of the diaphragm 159 within differential diaphragm switch 160 so that when the pressure at "L" is greater than the pressure at "M" the diaphragm will move upwards and move switch element 161 to its closed position, spring 189 holds switch 161 normally open and predetermines a certain differential pressure between "L" and "B" at which the switch 161 begins to operate. The pressure of the spring 189 may be varied by screw 191 contained under screw cap 190. When the pressure at "M" is greater than the pressure at "L," the diaphragm will move downwardly and the switch element 161 will be moved to the open position shown due to gas consumption by the carbonators or other use from the tanks 125. Under normal operation, the pressure at "L" will be greater than the pressure at "M" and the switch element 161 will be closed, permitting current to pass from the source 121 through line 162, line 163, electromagnetic coil 164, line 165, line 166, and back through line 167 to the source of current 121. This will effect energization of the electromagnetic coil 164 causing the pole piece 168 to move in a direction to close switches 169 and 170 whereby current may pass from source 121 through line 162, across switch 169, back through line 171 to the motor fan 120 and return through line 172, across switch 170 and by way of line 167 back to the electric source 121 to effect the operation of the motor fan 120. Hence when the differential diaphragm switch 160 is closed, the switches 169 and 170 will be closed and the motor fan 120 will operate to force heated ambient over the evaporator E to effect regasificaton of the relatively pure liquid carbon dioxide. When the temperature at the inlet 115 of the evaporator coil E is above 32° F., the thermostatic switch 144 will be in its closed position, and the current may pass from the source 121 through the line 162 across the switch 169, through the line 173 to the junction 174 and thence through the line 175, across the switch 144 downwardly through line 176 to the junction 177, through electromagnetic coil 178, line 179, line 180 to the junction 181, across switch 170, through line 167 and back to the source 121. This energization of the electromagnetic coil will effect movement of the pole piece 182 in a direction to close the switches 183 and 184 whereby current may pass from the source 121 through the line 162 across the switch 169 through line 173 to the junction 174, thence upwardly through the line 185 to the electromagnetic coil of the valve 116, thence downwardly through the line 186 across the switch 183 and back through lines 180, junction 181, across switch 170, and line 167 to the source 121. Accordingly, when the thermostatic switch 144 is closed, the electromagnetic valve 116 will be open, thereby permitting normal flow of the regasified carbon dioxide from the evaporator coil E to the storage tanks 125. As the evaporator coil E grows colder, the inlet 115 may drop to a temperature of 0° F. but the electromagnetic valve will still remain open if the thermostatic switch 156 is closed. This switch 156 is adapted to be closed at about 0° F. and opens at about minus 10° F. The switch 144 is adapted to be closed at about 32° F. and opened at about 0° F. Assuming the temperature of the carbon dioxide entering the evaporator coil E is dropped to 0° F., the switch 144 will be opened and the switch 156 will be closed. Current may then pass from the source 121 through the line 162, across switch 169, through line 173, across the switch 184 upwardly through the line 187, across the switch 156 downwardly through the line 188 to the junction 177, through the electromagnetic coil 178, line 179, line 180 to junction 181, across switch 170, and back through line 167 to the source 121. Hence, even with the switch 144 open, as long as the switch 156 is closed the electromagnetic coil 178 will be energized to hold the switches 183 and 184 in their closed position and the electromagnetic valve will be open as before. However, when the temperature at the outlet 118 of the evaporator coil E drops below minus 10° F., the switches 183 and 184 will be opened, the magnetic valve 116 will be closed and the fan 120 will force heated ambient over the evaporator coil E to de-ice or defrost the same for the circuit, since the fan 120, as has already been described, is only dependent on the position of the differential diaphragm switch 160. The system described will operate to effect the revolatilization or regasification of the relatively pure liquid carbon dioxide from the insulated storage tank 33 and pass it through the storage tanks 125 under normal conditions. However, should the evaporator coil E become heavily frosted as it drops to temperatures at or below minus 10° F., it will be automatically de-iced or defrosted and the flow from the regasified carbon dioxide intermittently cut off.

Figure 8:
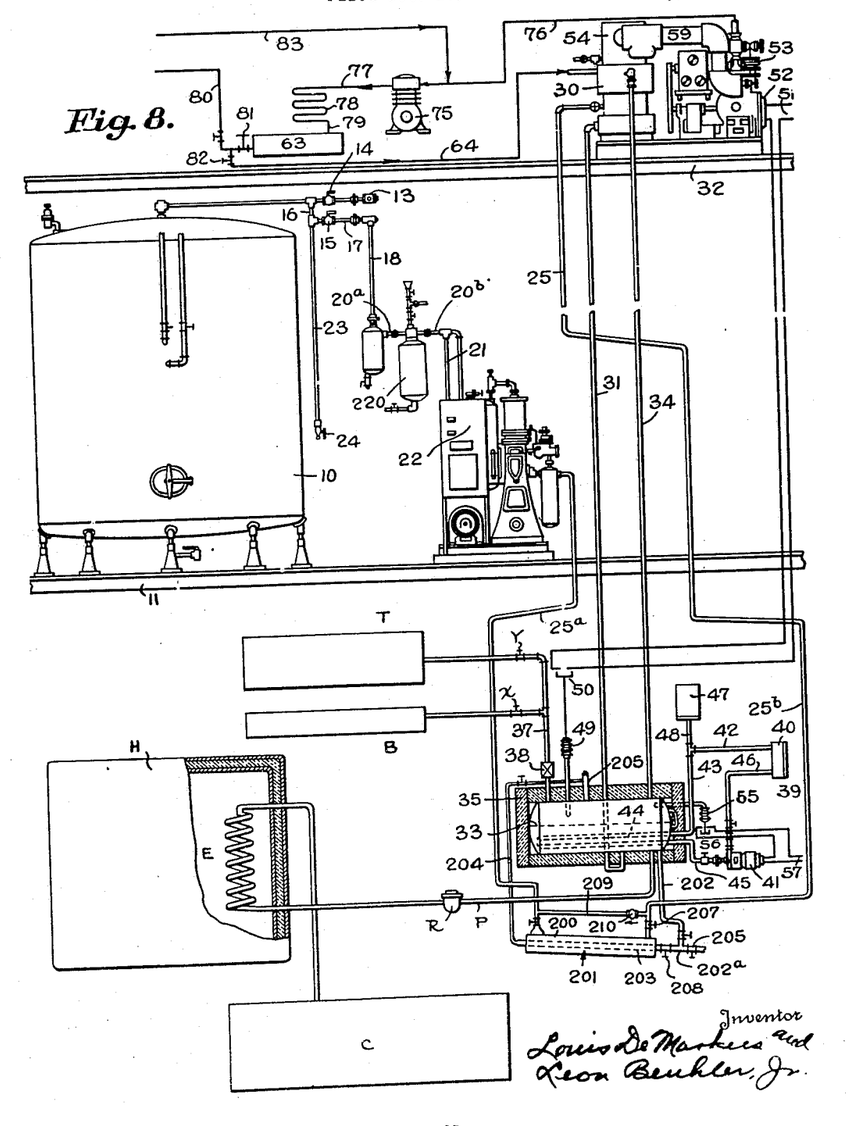
Fig. 8 is a view similar to Fig. 1 and illustrating a novel heat exchanger in association with the collection apparatus of the system.

A modified system of handling the fermentation gas evolved by the fermentation tank 10 and compressed and cooled by the compression apparatus 22 is illustrated in Fig. 8. Referring to this figure, the compressed and washed gas leaving the apparatus 22 is passed through the conduit 25a to the exterior cylinder 200 of precooler heat exchanger 201, wherein the gas is precooled to a temperature just above its condensing temperature. The precooled gas then leaves the heat exchanger 201 and traverses the conduit 25b which leads to the condensing apparatus 30. Liquid from the bottom of the storage tank 33 is passed through conduit 202 through interior cylinder 203 of heat exchanger 201 and thence through conduit 204 and connection 205 to the top of the storage tank 33, whereby the relatively cold liquid from the storage tank 33 is utilized to precool the compressed gas leaving the compression apparatus 22. This heat exchanger or precooler 201 serves to dehydrate the gas and, therefore, prevent rapid frosting of the condenser 30. The heat exchanger 21 may be periodically defrosted and the water removed through the conduit 202a by opening the valve 205, which valve is normally closed. Valve 206 may be provided in the line 25a, the valve 207 in the line 25b, and valve 208 in the line 202a, in order to control the flow of heat absorbing liquid and heat rejecting gas. It is significant that in addition to dehydrating the gas, the heat exchanger or precooler 201 serves to condense certain impurities from the gas with the water which materially benefits the final carbon dioxide liquid. One of these impurities has been found to be banana oil, and another impurity has been found to be ether. Hence, the importance of the heat exchanger precooler 201 will be appreciated. The heat exchanger 201 is arranged with its axis somewhat sloping from the horizontal and below the level of the storage tank 33 whereby the internal tube 203 becomes filled with carbon dioxide liquid and any gas boiling off returns to the top of the storage tank. This arrangement is decidedly advantageous and it cools the incoming gas from the line 25a very close to the liquefaction temperature without liquefying the same; hence, the apparatus is entirely automatic in that the carbon dioxide is being cooled at substantially the same pressure and it is not possible for the carbon dioxide to be cooled to the point where it will actually condense. A bypass 209 is connected between the lines 25a and 25b above the heat exchanger 201 and a check valve 210 is provided within the by-pass in order that back flow from the condenser 30 to the line 25a is permitted if the gas supply pressure drops, which back flow shunts the heat exchanger.

Figure 9:
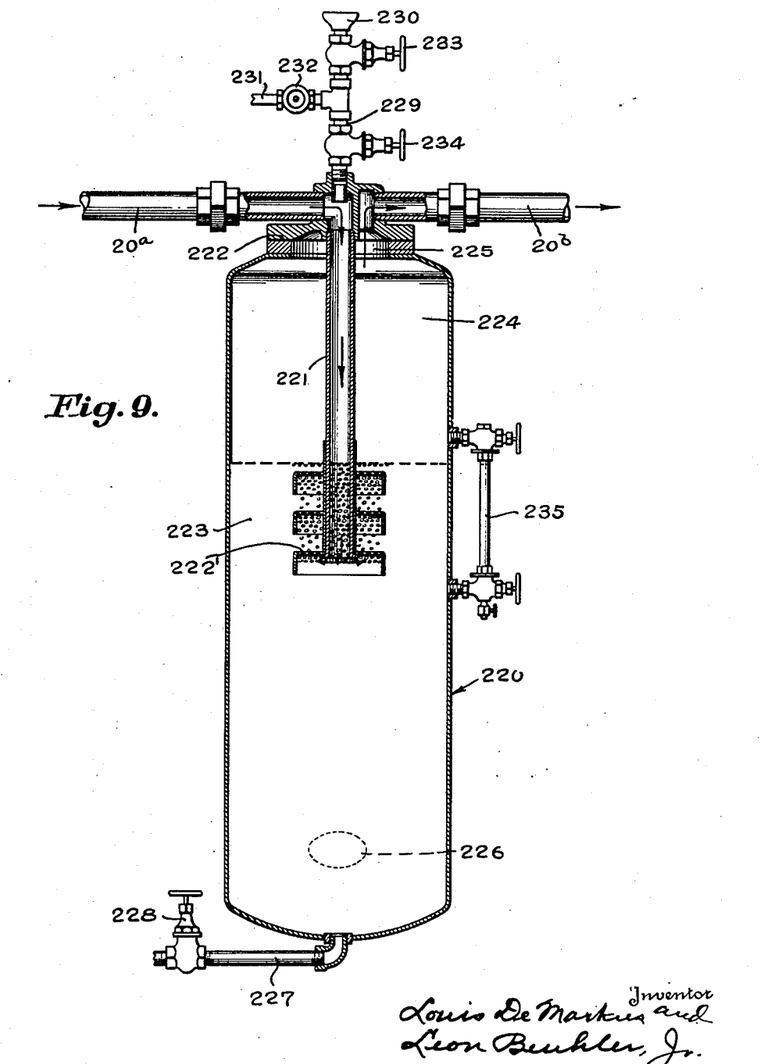
Fig. 9 is an enlarged sectional detail view of a gas purifier included in the system shown in Fig. 8.

It is to be understood that it is within the scope of the invention to provide deodorizers in the lines leading to the shipping containers to be filled in order to remove any volatiles and their characteristic odors. One such deodorizer or gas purifier 220 may be located immediately prior to the compressing apparatus 22, see Fig. 8, which deodorizer or gas purifier is shown in detail in Fig. 9. The conduit 20a leads to deodorizer or gas purifier 220 wherein the gas is conducted through downwardly depending central pipe 221 supported by head 222 and up through the scrubber screens 222', through the deodorizing or purifying liquid 223, which may be permanganate of potash, to the collecting chamber 224, and thence out through opening 225, in the head 222 to the line 20b leading to the compressing apparatus. A hand hold 226 may be conveniently located near the bottom of the deodorizer or purifier 220, and drain pipe 227 may lead from the bottom thereof, which drain pipe may be controlled by valve 228. A filler or charging assembly 229 may be associated with the top head 222 and comprise a chemical inlet funnel 230, and a water inlet 231 controlled by valve 232. Valves 233 and 234 may be located in the assembly 229 immediately prior and subsequent to the water inlet respectively. A sight glass assembly 235 may be associated with the deodorizer or purifier 220 for indicating the level of the liquid chemical therewithin. In operation the gas from the fermentation tank 10 is passed through the deodorizer or purifier and the deodorized and purified gas is then led to the compression apparatus from whence it is conducted to the collecting, storage and utilization equipment. The use of the deodorizer or purifier is particularly essential when some of the gas is to be subsequently used in connection with soft drinks and the like.

It is well known that during the fermentation cycle different qualities of carbon dioxide are evolved at different times. Hence, in the brewery where gas is to be used for beer carbonating it is not always necessary for it to be passed through a purifier as described above, providing that only gas of high quality is collected. However, less desirable gas may be passed through the purifier and it is then satisfactory for use in beer carbonation. When the gas is to be used for other purposes, such as soft drinks and the like, the permanganate purifier is very essential, as is also the action of the heat exchanger 201 and the condenser 30, which further improve the quality of the gas coming from the purifier. The advantages derived from these elements arranged in the particular combinations described have been proved not only by the smelling of the gas by experts, but also by quantitative tests which indicate the elimination of air, and further, the manipulation of various drain valves such as on the precooler or heat exchange 201 has made it possible to take samples for examination and analysis, which samples have indicated by their odor and otherwise that undesirable constituents have been removed.

The above described apparatus and method serve to ingeniously effect liquefaction of fermentation gases in order to store and purify at least a portion thereof, continuously remove unliquefied portions from the surface of the liquefied portion, whereby the relatively impure gases will not contaminate the pure gases, and distribute the purified liquid to places of utilization in the beer making process where pure gases are required for excellency of finished product, and further, serve to distribute unliquefied portions of carbon dioxide gas to those places of utilization where the highest standard of carbon dioxide gas is not required. The invention also contemplates a novel collecting, transferring and storing apparatus and method whereby the liquid carbon dioxide may be collected, transferred and stored in portable shipping containers.

It will be obvious to those skilled in the art that various changes may be made in this device without departing from the spirit of the invention and therefore the invention is not limited to what is shown in the drawings and described in the specification but only as indicated in the appended claims.

What is claimed is:

1. In refrigeration apparatus, an evaporator, a fermentation tank of the character utilized in the manufacture of beer, means for passing evolved fermentation gas in heat exchange relation with said evaporator to condense a condensible portion of said gas, means for collecting said condensate including a gas space for housing vapor above said condensate including a non-condensible portion, means for carbonating a product of said fermentation tank such as beer, a means for utilizing said condensate removed from below the liquid level in said collecting means in said carbonating means.

2. The structure recited in claim 1, and means for distributing gas from said vapor space in contact with said condensate to points of utilization, such as for the displacement of air from receptacles, in connection with the manufacture of the completely packaged fermented product of said tank, such as packaged beer.

3. The structure recited in claim 1, and means for utilizing the gas from said gas space for transporting a product of said fermentation tank, such as for example, the transportation of beer in bulk.

4. In apparatus for brewing beer, a fermentation tank, a condenser for condensing gas evolved by said tank, a collector for collecting said condensate including a gas space above the condensate space, means for treating said beer with relatively pure fermentation gas obtained from the condensible portion of the evolved gas existing in liquid form below the level of said condensate, means for associating said beer with fermentation gas obtained from said gas space above said condensate, a distributor for passing fermentation gas condensate from below the liquid level in said collector to a place of utilization in connection with said first mentioned means, and a distributor for passing fermentation gas from said gas space to said second mentioned means.

5. The method of handling and carbonating beer comprising, condensing at least a portion of the condensible fermentation gas evolved by said beer, taking condensate from below its liquid level, gasifying same, and utilizing this gasified fermentation gas for carbonation, and utilizing the fermentation gas above the liquid level which may include a non-condensible portion for otherwise handling said beer such as for example in transportation and in the filling of containers with the said beer.

6. In refrigeration apparatus, an evaporator, a fermentation tank of the character utilized in the manufacture of beer, means for leading gas evolved by said tank in heat exchange relation with said evaporator to condensate at least a fraction of the condensible portion of said gas, means for collecting fermentation gas condensate, means for utilizing said condensate in gaseous form obtained from below the liquid level of said condensate in association with a product of said tank such as beer, means for effecting regasification of said condensate located between said condensate collector and said means for utilizing the condensate, said regasification means including a heat absorber, and a reducing valve located prior to said heat absorber.

7. In refrigeration apparatus, an evaporator, a fermentation tank of the character utilized in the manufacture of beer, means for leading gas evolved by said tank in heat exchange relation with said evaporator to condense at least a fraction of the condensible portion of said gas, means for collecting fermentation gas condensate, means for utilizing said condensate in gaseous form obtained from below the liquid level of said condensate in association with a product of said tank such as beer, means for effecting regasification of said condensate located between said gas collector and said means for utilizing said condensate, said regasification means including a heat absorber, and flow condition pressure reducing means located subsequent to said heat absorber.

8. In refrigeration apparatus, an evaporator, a fermentation tank of the character utilized in the manufacture of beer, means for leading gas evolved by said tank in heat exchange relation with said evaporator to condense at least a fraction of the condensible portion of said gas, means for collecting fermentation gas condensate, means for effecting regasification of said condensate withdrawn from below the liquid level of said condensate including a heat absorber, means for effecting flow of warm ambient over said heat absorber, and means for controlling said flow in accordance with the pressure of said gas subsequent to its leaving the said heat absorber.

9. In refrigeration apparatus, an evaporator, a fermentation tank of the character utilized in the manufacture of beer, means for leading gas evolved by said tank in heat exchange relation with said evaporator to condense at least a fraction of the condensible portion of said gas, means for collecting fermentation gas condensate, heat absorber means for regasifying said condensate obtained from below the liquid level of said condensate connected with said collecting means, a receiver for said regasified gas, means for connecting said heat absorber means with said receiver, a valve between said absorber and said receiver, and means for controlling the operation of said valve in accordance with temperature conditions within said heat absorber.

10. The structure recited in claim 9, said regasifying means including a heat absorber, said control means including a thermostat associated with the inlet to said heat absorber, and a thermostat associated with the outlet of said heat absorber.

11. The structure recited in claim 9, said regasifying means including a heat absorber and means for passing warm ambient thereover, and means responsive to pressure conditions in the connection between the heat absorber and the receiver for controlling the flow of ambient over said heat absorber.

12. In refrigeration apparatus, an evaporator, a fermentation tank of the character utilized in the manufacture of beer, means for leading gas evolved by said tank in heat exchange relation with said evaporator to condensate at least a fraction of the condensible portion of said gas, means for collecting fermentation gas condensate, a heat absorber, conduit means connecting said collecting means from below the liquid level of condensate therein with said absorber, means for flowing relatively warm ambient over said heat absorber, a re-evaporated gas receiver, conduit means for connecting said heat absorber with said receiver, an automatic valve, a metering orifice, a check valve in said last mentioned conduit means, means responsive to the pressure within the conduit means connecting said heat absorber with said receiver for controlling the flow of ambient over said evaporator, and means for controlling said automatic valve including a thermostat associated with the inlet to said evaporator coil and a second thermostat associated with the outlet of said evaporator coil, said automatic valve being adapted to be held open in accordance with the operation of said first and second thermostats, said first thermostat being adapted to hold said automatic valve open only when it is above a predetermined normal temperature, said second thermostat cooperating with said automatic valve being adapted to hold said automatic valve open only above a lower predetermined temperature, said automatic valve being adapted to be closed below said lower predetermined temperature, whereby said heat absorber may be periodically defrosted when the temperature therein drops below the said lower predetermined temperature.

13. The structure recited in claim 12, said pressure control means for controlling the flow of ambient over said heat absorber being responsive to the differential in pressure along at least two spaced points of the conduit connecting said heat absorber with said receiver and acting to effect flow of said ambient when the pressure is higher adjacent said heat absorber and lower along the conduit extending toward said receiver.

14. In refrigeration apparatus, an evaporator, a fermentation tank of the character utilized in the manufacture of beer, means for passing evolved fermentation gas in heat exchange relation with said evaporator to condensate said gas, means for passing said condensate in heat exchange relation with additional evolved fermentation gas to precool the same, means for passing said precooled gas in heat exchange relation with said evaporator to condense same, and means for utilizing said final condensate for carbonation.

15. In refrigeration apparatus, an evaporator, a fermentation tank of the character utilized in the manufacture of beer, means for passing evolved fermentation gas in heat exchange relation with said evaporator to condense said gas, means for storing said condensate including a liquid space and a gas space, means for withdrawing liquid condensate from said storing means and passing it in heat exchange relation with additional evolved fermentation gas to precool the same while maintaining it in a gaseous condition, means for returning regasified liquid from said storing means back to the gas space of said storing means, means for passing said precooled fermentation gas in heat exchange relation with said evaporator to condense the same, means for passing the thus formed condensate to said storing means, and means for utilizing said final condensate within said storing means for carbonation.

LOUIS DE MARKUS.
LEON BUEHLER, Jr.